US006375341B1

(12) United States Patent
Denley

(10) Patent No.: US 6,375,341 B1
(45) Date of Patent: Apr. 23, 2002

(54) ELECTRO-FORMED BULB SHIELD AND METHOD OF MAKING SAME

(75) Inventor: Ronald S. Denley, Woodstock, IL (US)

(73) Assignee: Elco Textron, Inc., Rockford, IL (US)

( * ) Notice: Subject to any disclaimer, the term of this patent is extended or adjusted under 35 U.S.C. 154(b) by 0 days.

(21) Appl. No.: 09/574,158

(22) Filed: May 18, 2000

Related U.S. Application Data

(60) Provisional application No. 60/149,972, filed on Aug. 20, 1999.

(51) Int. Cl.[7] .......... B60Q 1/04

(52) U.S. Cl. .......... 362/539; 362/487; 362/509

(58) Field of Search .......... 362/539, 487, 362/305, 351, 364, 296, 341, 298, 509; 313/635, 117

(56) References Cited

U.S. PATENT DOCUMENTS

| | | | | |
|---|---|---|---|---|
| 5,497,298 A | | 3/1996 | Luallin et al. | |
| 5,497,299 A | | 3/1996 | Wisler et al. | |
| 5,850,124 A | | 12/1998 | Hasegawa et al. | |
| 5,962,973 A | | 10/1999 | Rice | |
| 6,010,236 A | | 1/2000 | Lai | |
| 6,012,830 A | * | 1/2000 | Fraizer | 362/539 |
| 6,267,488 B1 | * | 7/2001 | Muegge et al. | 362/509 |
| 6,280,071 B1 | | 8/2001 | Yamamoto et al. | |

* cited by examiner

*Primary Examiner*—Alan Cariaso
*Assistant Examiner*—Bao Truong
(74) *Attorney, Agent, or Firm*—Trexler, Bushnell, Giangiorgi, Blackstone & Marr, Ltd.

(57) ABSTRACT

A bulb shield for use in an automotive headlamp assembly, and a method for making same. The bulb shield includes a cup portion and a portion which extends from the cup portion and is configured for mounting to a reflector of the automotive headlamp assembly or to another, proximate structure. When the bulb shield is mounted, the cup portion is preferably generally horizontally aligned with a headlamp bulb in the automotive headlamp assembly, thereby eliminating a "hot spot" which would otherwise be viewable when looking into the headlamp beam. Preferably, at least a portion of the cup portion of the bulb shield is electroformed. Such a bulb shield is relatively inexpensive and easy to make, yet can withstand the high temperatures which are typically experienced in an automotive headlamp assembly. Additionally, such a bulb shield can be inexpensively provided, yet meet precision requirements. Still further, such a bulb shield provides enhanced design flexibility and styling consistent with plastic molding.

17 Claims, 9 Drawing Sheets

ELECTRO-FORMED BULB SHIELD AND METHOD OF MAKING SAME

RELATED APPLICATION

This application claims the benefit of U.S. Provisional Application Ser. No. 60/149,972, filed Aug. 20, 1999.

BACKGROUND OF THE INVENTION

The present invention relates generally to bulb shields for use in automotive headlamp assemblies, and relates more specifically to an electro-formed bulb shield.

The present invention also relates generally to methods of making bulb shields which are employed in automotive headlamp assemblies, and relates more specifically to a method of making a bulb shield where the method includes a step of electro-forming at least a portion of a bulb shield.

Automotive headlamp assemblies generally include a headlamp bulb which is positioned in a reflector. A bulb shield is mounted to the reflector, and is positioned generally in front of the headlamp bulb. While the reflector functions to reflect light from the headlamp bulb forward, thus forming a headlamp beam, the bulb shield functions to prevent an oncoming driver from seeing a "hot spot" in the headlamp beam.

Bulb shields typically include a cup portion which is disposed generally in front of the headlamp bulb, and portion which extends from the cup portion and mounts to the reflector or some other proximate structure. The cup portion of the bulb shield is usually relatively sharply concave, thereby providing that the light which enters the cup portion is reflected generally back to the headlamp beam.

Fabricating a bulb shield out of metal, such as out of a thin gauge steel, is difficult because of the peripheral edge of the cup portion having to meet precision requirements. Because the deep draw of the cup portion stretches the material somewhat randomly, trimming the peripheral edge of the cup portion is costly.

Instead of metal, it would be beneficial to provide a bulb shield which is at least partly formed of plastic. Plastic is not only lightweight and relatively inexpensive, but would provide that a bulb shield can be made within a plastic injection molding process. However, the cup portion of a bulb shield typically experiences extremely high temperatures, and most plastics which have a reasonable cost cannot endure such high temperatures. Specifically, the cup portion of a bulb shield often experiences temperatures as high as, or even higher than, 500° Fahrenheit (260° Celsius). Because low cost plastics cannot generally withstand such high temperatures, it has not been possible to provide a low cost, part plastic bulb shield for use in an automotive headlamp assembly. Alternatively, it would be beneficial to provide a metal bulb shield, wherein at least a portion of the bulb shield is electro-formed.

OBJECTS AND SUMMARY

Accordingly, it is an object of an embodiment of the present invention to provide a bulb shield for use in an automotive headlamp assembly, where the bulb shield includes a portion which is electro-formed.

Another object of an embodiment of the present invention is to provide a method of making a bulb shield for use in an automotive headlamp assembly, where the method includes an electro-forming step.

Still yet another object of an embodiment of the present invention is to provide a bulb shield for use in an automotive headlamp assembly, where the bulb shield is part plastic, part metal.

Briefly, and in accordance with one or more of the foregoing objects, an embodiment of the present invention provides a bulb shield for use in an automotive headlamp assembly, and a method for making same. The bulb shield includes a cup portion and a portion which extends from the cup portion and is configured for mounting to a reflector of the automotive headlamp assembly or to another, proximate structure. When the bulb shield is mounted, the cup portion is preferably generally horizontally aligned with a headlamp bulb in the automotive headlamp assembly, thereby eliminating a "hot spot" which would otherwise be viewable when looking into the headlamp beam. Preferably, at least a portion of the bulb shield is electro-formed. Such a bulb shield is relatively inexpensive and easy to make, yet can withstand the high temperatures which are typically experienced in an automotive headlamp assembly. Another embodiment of the present invention provides a method of making an electro-formed bulb shield for use in an automotive headlamp assembly.

BRIEF DESCRIPTION OF THE DRAWINGS

The organization and manner of the structure and function of the invention, together with further objects and advantages thereof, may be understood by reference to the following description taken in connection with the accompanying drawings, wherein.

DESCRIPTION OF EMBODIMENTS OF THE INVENTION

Figure 1:
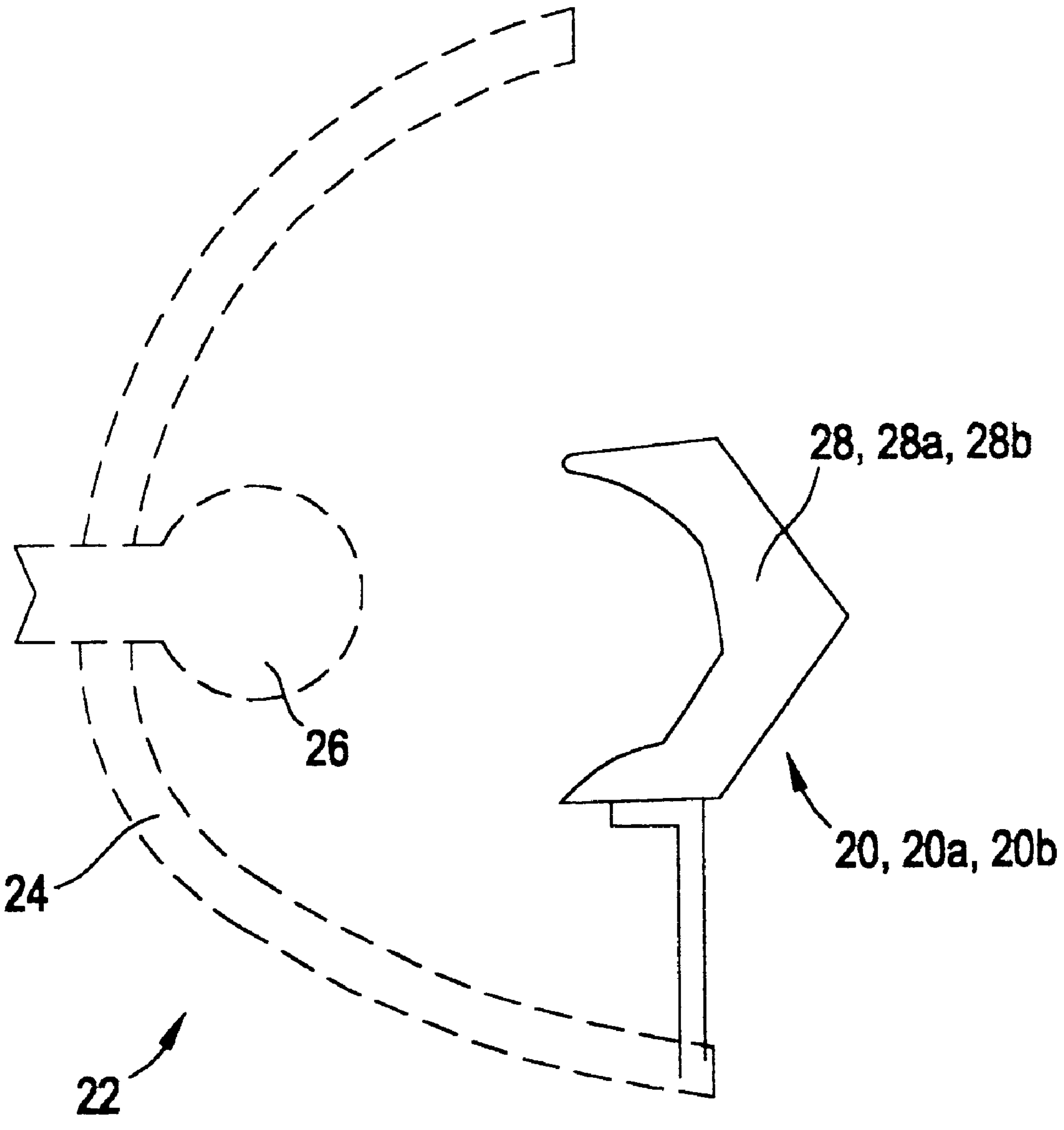
FIG. 1 is a simplified, schematic view of a portion of an automotive headlamp assembly, showing a reflector, a headlamp bulb and a bulb shield, wherein the bulb shield is shown bottom-mounted in the assembly.

While the present invention may be susceptible to embodiment in different forms, there is shown in the drawings, and herein will be described in detail, embodiments of the invention with the understanding that the present description is to be considered an exemplification of the principles of the invention and is not intended to limit the invention to that as illustrated and described herein.

Figure 9:
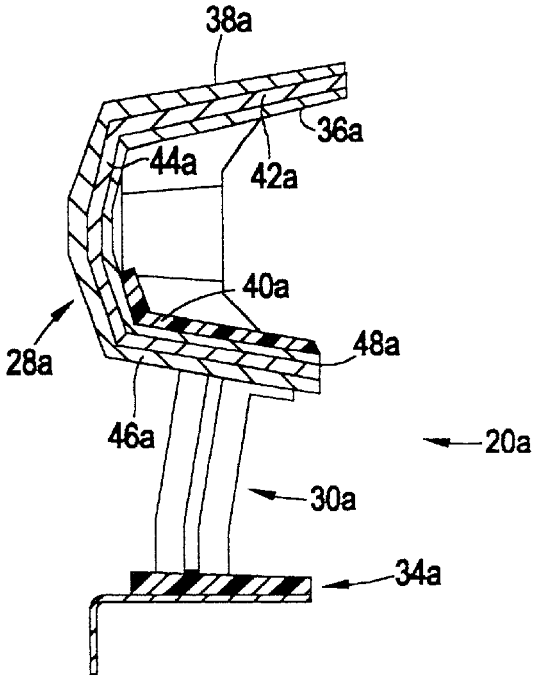
FIG. 9 is a side, cross-sectional view, similar to FIG. 6, of a bulb shield which is in accordance with still another embodiment of the present invention.
Figure 12:
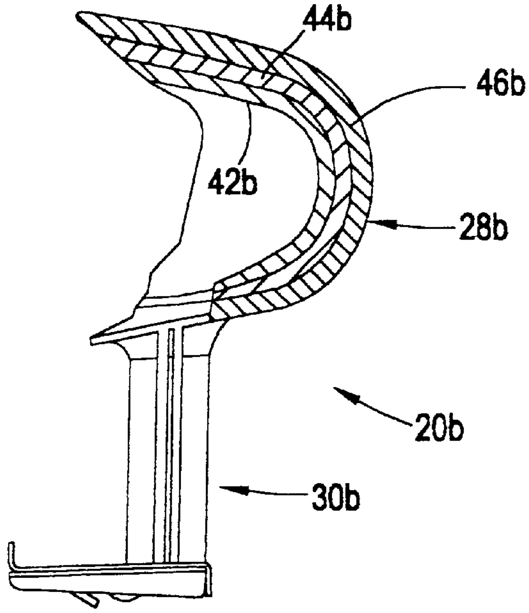
FIG. 12 is a side, cross-sectional view, similar to FIGS. 6 and 9, of a bulb shield which is in accordance with still yet another embodiment of the present invention.

A bulb shield 20 which is in accordance with one embodiment of the present invention is illustrated in FIGS. 2–6, a bulb shield 20*a* which is in accordance with another embodiment of the present invention is illustrated in FIG. 9, and a bulb shield 20*b* which is in accordance with still yet another embodiment of the present invention is illustrated in FIG. 12. All three bulb shields 20, 20*a,* 20*b* provide several advantages. Each is generally lightweight, inexpensive and easy to make. In addition, each can withstand the high temperatures which are typically experienced in an automotive headlamp assembly.

Figure 1A:
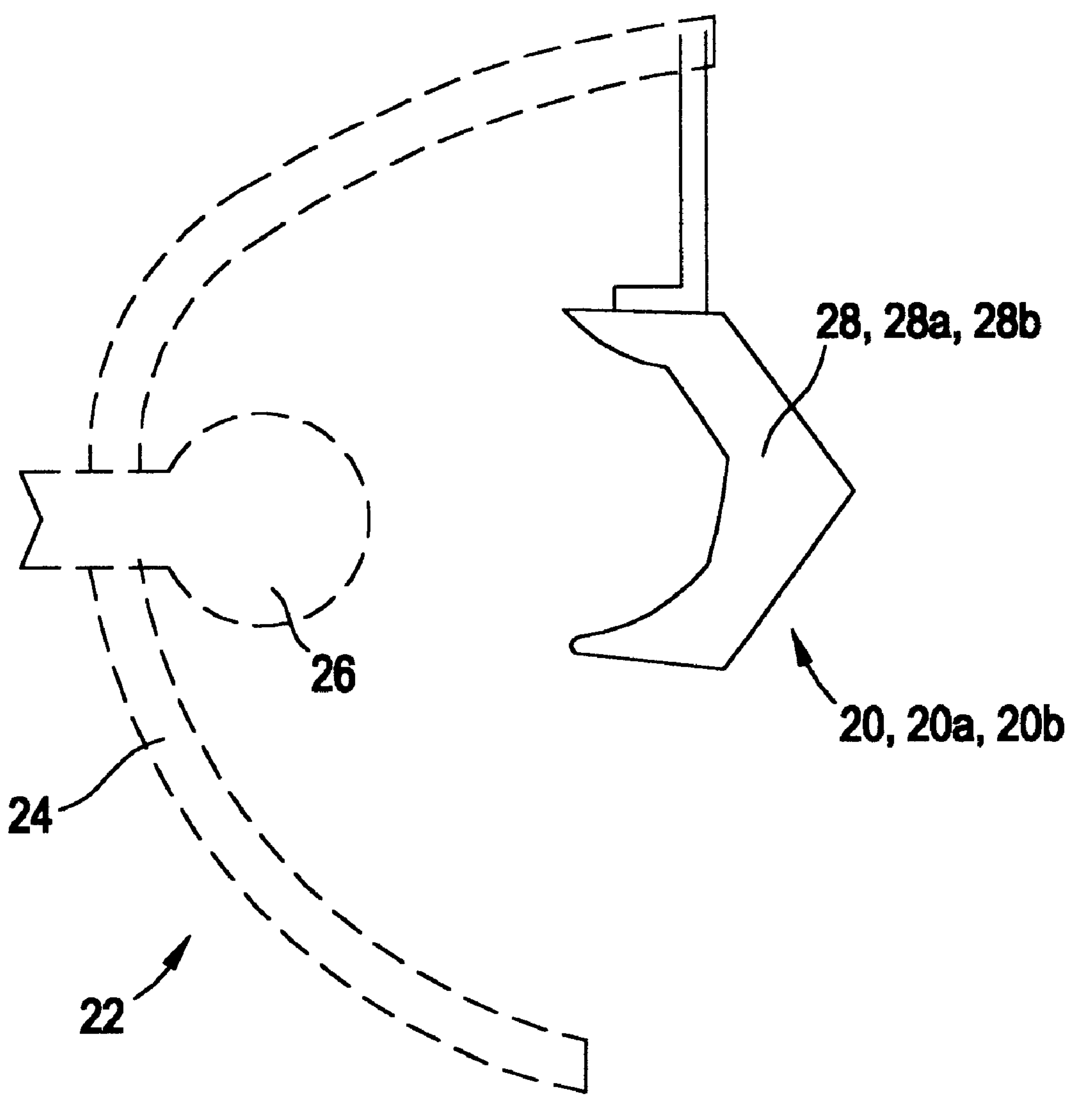
FIG. 1A is a view similar to that of FIG. 1, but showing the bulb shield top-mounted in the assembly.
Figure 2:
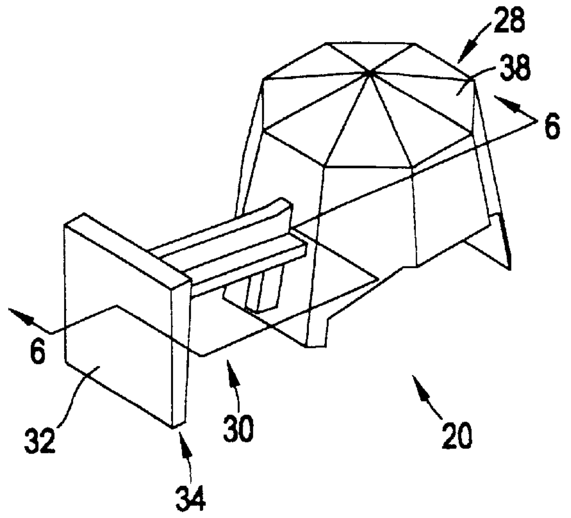
FIG. 2 is a front, perspective view of a bulb shield which is in accordance with one embodiment of the present invention.
Figure 3:
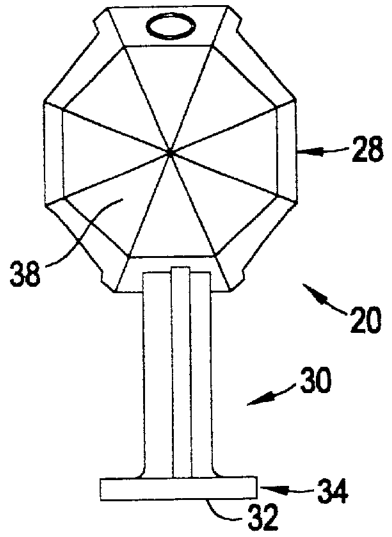
FIG. 3 is a front, elevational view of the bulb shield illustrated in FIG. 2.
Figure 4:
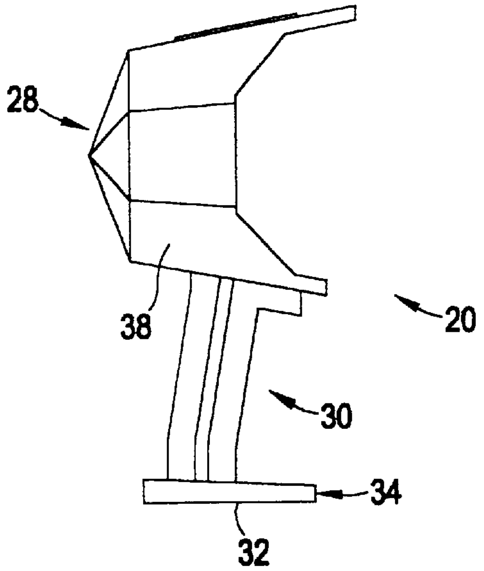
FIG. 4 is a side, elevational view of the bulb shield illustrated in FIG. 2.
Figure 5:
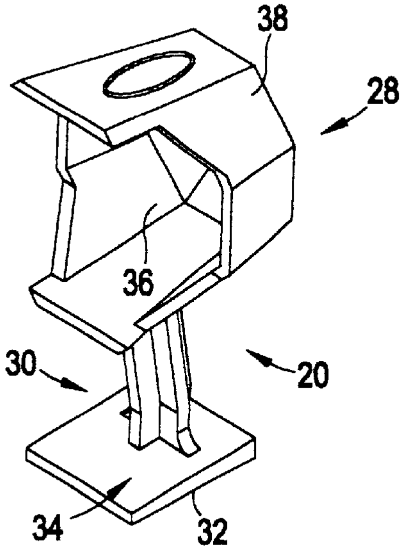
FIG. 5 is a rear, perspective view of the bulb shield illustrated in FIG. 2.
Figure 6:
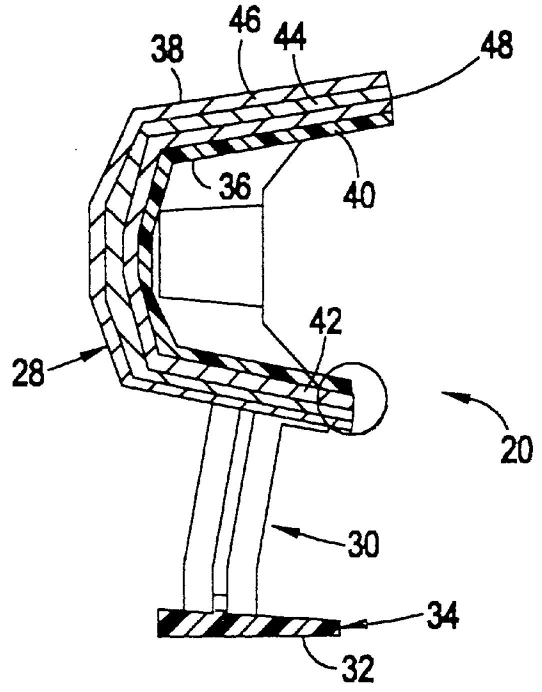
FIG. 6 is a side, cross-sectional view of the bulb shield illustrated in FIG. 2, taken along line 6—6 of FIG. 2.

FIGS. 1 and 1A depict how any one of the bulb shields 20, 20*a,* 20*b* are envisioned to be incorporated into an automotive headlamp assembly 22. As shown, the headlamp assembly 22 includes a reflector 24 and a headlamp bulb 26 disposed in the reflector 24. The bulb shield 20, 20*a,* 20*b* is mounted to the reflector 24. While FIG. 1 shows the bulb shield 20, 20*a,* 20*b* bottom-mounted in the assembly 22, FIG. 1A shows the bulb shield 20, 20*a,* 20*b* top-mounted in the assembly. Regardless of whether the bulb shield 20, 20*a,* 20*b* is bottom-mounted or top-mounted, preferably the bulb shield 20, 20*a,* 20*b* is mounted to the reflector 24 or some other proximate structure such that a cup portion 28, 28*a,* 28*b* of the bulb shield 20, 20*a,* 20*b* is generally horizontally aligned with the headlamp bulb 26. Such alignment between the headlamp bulb 26 and the cup portion 28, 28*a,* 28*b* of the bulb shield 20, 20*a,* 20*b* causes the cup portion 28, 28*a,* 28*b* to block or eliminate the "hot spot" which would otherwise be viewable by, for example, an oncoming driver who looks in the direction of the projected headlamp beam.

The bulb shield 20 illustrated in FIGS. 2–7 will now be described. As shown, the bulb shield 20 includes a cup portion 28 and a stem portion 30 which extends from the cup portion 28. Preferably, it is the end 32 of the stem portion 30 which is configured for mounting the bulb shield 20. Specifically, as shown, the end 32 of the stem portion 30 may include a base 34 which is receivable in a corresponding channel, where the channel is provided either on the reflector or on another, proximate structure for mounting the bulb shield 20. Preferably the stem portion 30 is of a length which provides that when the bulb shield 20 is mounted, the bulb shield 20 is generally aligned with the headlamp 26 (see FIG. 1) such that the bulb shield 20 eliminates the "hot spot" which would otherwise be caused by the headlamp bulb 26.

As shown, preferably the cup portion 28 of the bulb shield 20 is sharply concave having an inside surface 36 and an outside surface 38, wherein the inside surface 36 generally faces the headlamp bulb 26 when the bulb shield 20 is correctly mounted. Alternatively, the cup portion 28 may take some other shape. Regardless of the shape of this portion of the bulb shield 20, preferably the portion 28 is configured to block or eliminate the headlamp beam "hot spot" when the bulb shield 20 is correctly mounted.

Figure 7:
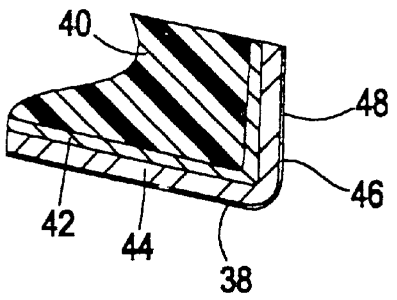
FIG. 7 is a view showing detail of a circled portion of FIG. 6.

While the stem portion 30 of the bulb shield 20 is preferably made of plastic, the cup portion 28 is preferably made of one or more layers of metal which are disposed on plastic. To this end, the bulb shield 20 may comprise a single plastic part including the stem portion 30 and cup portion 28, where the cup portion 28 has one or more metal layers deposited on the plastic. More specifically, as shown in FIG. 7, preferably the cup portion 28 includes a plastic layer 40, which is effectively the inside surface 36 of the cup portion 28, and a plurality of metal layers 42, 44, 46 deposited on the opposite surface 38 of the cup portion 28. The plastic may be a high heat-resistant injection molding material, such as polyphenelene sulfide, "Fortron" or "Ryton." The plurality of metal layers which are layered on the plastic may include a layer 42 of copper which is electro-formed onto the surface of the plastic 40 at a thickness of 0.0100 to 0.0110 inches, a layer 44 of nickel which is plated over the layer 42 of electro-formed copper at a thickness of 0.00015 to 0.0002 inches, and an exterior layer 46 of decorative chrome plated over the nickel plating layer 44 at a thickness of 0.00035 to 0.0005 inches. In other words, the bulb shield 20 may comprise a single plastic part having a stem portion 30 and a cup portion 28, where the outside surface 38 of the cup portion 28 is layered with copper, nickel and then chrome. Of course, other materials and/or thicknesses may be utilized.

The layers 42, 44, 46 of metal on the outside surface 38 of the cup portion 28 of the bulb shield 20 provides that the cup portion 28 can withstand the high temperatures which are experienced by the bulb shield 20 when the bulb shield 20 is employed in an automotive headlamp assembly 22, as shown in FIG. 1. The electro-forming and plating provides that the cup portion 28 becomes captive, so that different thermal coefficients of expansion will permit the materials to grow separately, but still remain attached and assembled. The electro-forming and plating also provides that the peripheral surface 48 of the cup portion 28 is shaped and sized to meet precision requirements.

Figure 8:
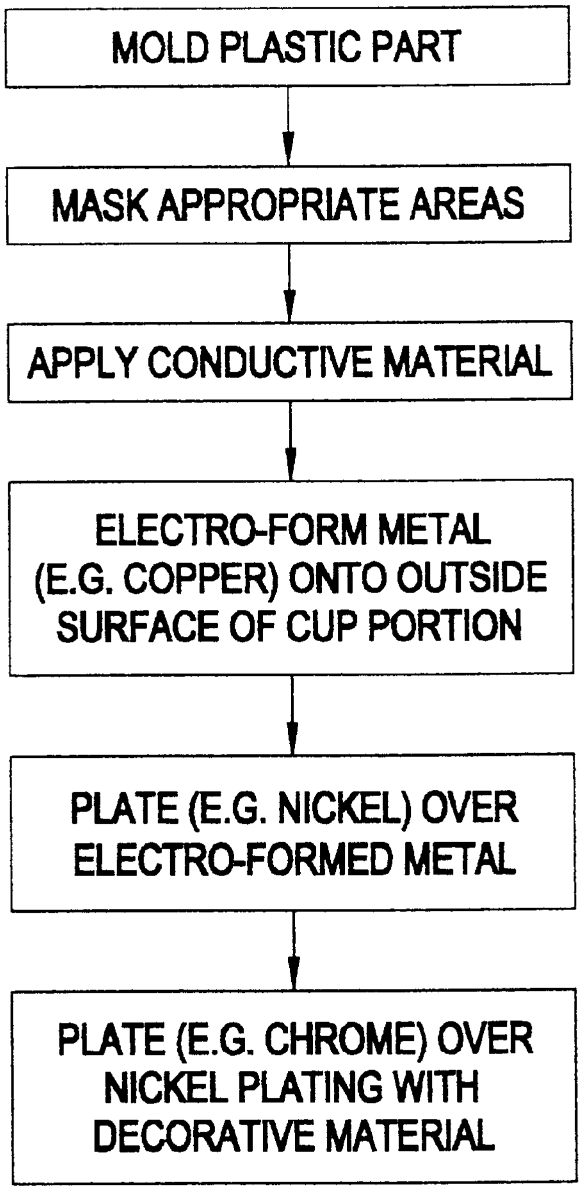
FIG. 8 is a block diagram of a method which can be employed to make the bulb shield shown in FIGS. 2–7.

A method which can be used to make the bulb shield 20 shown in FIGS. 2–7 will now be described with reference to FIG. 8. First, a plastic part is plastic injection molded. Specifically, preferably a plurality of identical plastic parts are molded simultaneously using a multiple cavity tool. The plastic used to mold the part(s) is preferably a high heat-resistant injection molding material, such as polyphenelene sulfide, "Fortron" or "Ryton," as discussed above. Each plastic part provides the stem portion 30 and the inside surface 36 of the cup portion 28, as shown in FIGS. 2–7. Then, preferably, the inside surface 36 of the cup portion 28, as well as the entire stem portion 30, is masked (perhaps by using a masking tool) from electro-forming. After the appropriate areas have been masked, a generally conductive material, such as silver nitrate, is sprayed or otherwise applied to the outside surface 38 of the cup portion 28 of the bulb shield 20. Then, a metal material, such as copper (type II) at a thickness of 0.0100—0.0110 inches, is electro-formed onto the outside surface 38 of the cup portion 28 (thereby providing layer 42). Then, another metal material, such as nickel at a thickness of 0.00015–0.0002 inches, is plated over the electro-formed layer 42 of copper (thereby providing layer 44). Finally, a decorative metal material, such as decorative chrome at a thickness of 0.00035–0.005 inches, is plated over the nickel flash (plating) (thereby providing layer 46). Hence, the plastic layer 40 of the cup portion 28 of the bulb shield 20 functions as a mandrel during the electro-forming, yet remains part of the bulb shield 20. Overall, such a process is simple and easy to perform. Additionally, such a process yields a bulb shield 20 which has desired properties, such as being lightweight and relatively inexpensive, yet meets precision requirements at the peripheral edge 48.

As mentioned hereinabove, FIG. 9 depicts a bulb shield 20*a* which is in accordance with a second embodiment of the present invention. This bulb shield 20*a* will now be described. Because the bulb section 20*a* shown in FIG. 9 is very similar to the bulb shield 20 shown in FIGS. 2–7, similar reference numerals are used for corresponding parts, and the alphabetic suffix "a" is added.

As shown in FIG. 9, the bulb shield 20*a,* like the bulb shield 20 shown in FIGS. 2–7, also includes a stem portion 30*a* (which preferably includes a mounting base 34*a*), and a cup portion 28*a.* However, the bulb shield 20*a* shown in FIG. 9 includes a plastic layer 40*a* which does not extend fully along the inside surface 36*a* of the cup portion 28*a.* Instead, the plastic layer 40*a* extends only along a portion of the inside surface 36*a* of the cup portion 28*a.* The plastic layer 40*a* may comprise a high heat-resistant injection molding material, such as polyphenelene sulfide, "Fortron" or "Ryton." As shown, a layer 42*a* of metal, such as a layer of electro-formed copper at a thickness of 0.0100 to 0.0110, is provided at the area where the inside surface 36*a* of the cup portion 28*a* does not include plastic. While FIG. 9 depicts the situation where the bulb shield 20*a* is configured for bottom-mounting within an assembly 22 (see FIG. 1), the bulb shield 20*a* may instead be configured for top mounting (see FIG. 1A).

It is possible to provide plastic on the inside surface 36*a* of the cup portion 28*a* at the area shown in FIG. 9 becomes generally, when the bulb shield 20*a* is correctly mounted in an automotive headlamp assembly (see FIG. 1), the electro-formed metal layer 42*a* experiences greater heat than does the adjacent plastic layer 40*a* on the inside surface 36*a* of the cup portion 28*a.* This is because the temperature of the headlamp bulb 26 is transferred by convection to the bulb shield 20*a,* and the highest temperature is generally experienced at the upper area of the inside surface 36*a* of the cup portion 28*a* (the area which does not include the plastic). It is estimated that the area of the inside surface 36*a* of the cup portion 28*a* where the plastic 40*a* is located experiences less heat than the remainder of the inside surface 36*a* of the cup portion 28*a.*

The bulb shield 20*a* shown in FIG. 9 also preferably includes a layer 44*a* of nickel which is plated over the layer 42*a* of electro-formed copper at a thickness of 0.00015 to 0.0002 inches, and an exterior layer 46*a* of decorative chrome plated over the nickel plating at a thickness of 0.00035 to 0.0005 inches. Of course, other materials and/or thicknesses may be utilized.

The layers 42*a,* 44*a,* 46*a* of metal on the outside surface 38*a* of the cup portion 28*a* of the bulb shield 20*a* provide that the cup portion 28*a* can withstand the high temperatures which are experienced by the bulb shield 20*a* when employed in an automotive headlamp assembly 22. The electro-forming provides that inner layers of the cup portion 28*a* become captive, so that different thermal coefficients of expansion will still permit the materials to grow separately, bill still remain attached and assembled. The electro-forming also provides that the peripheral surface 48*a* of the cup portion 28*a* can be metal, yet can still meet precision requirements and at a reasonable cost.

Figure 11:
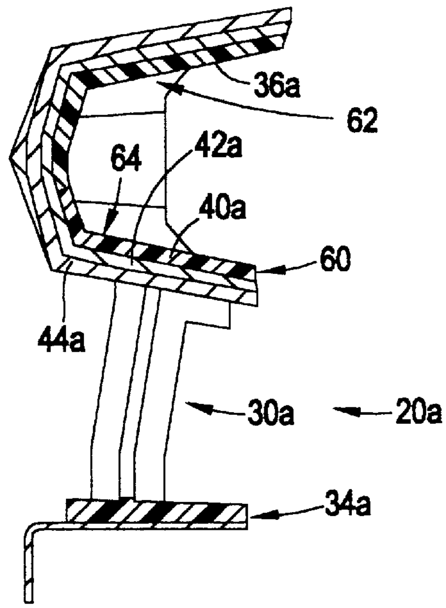
FIG. 11 is a view similar to FIG. 9, but showing the bulb shield before a portion of an inside surface of a cup portion of the bulb shield is melted away.
Figure 10:
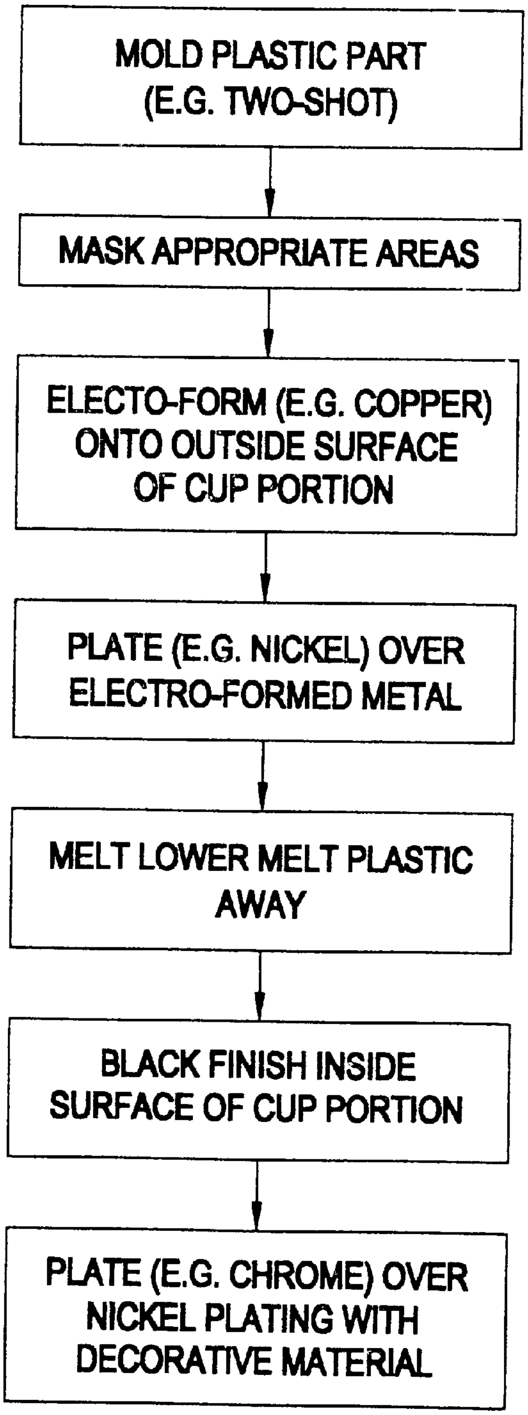
FIG. 10 is a block diagram of a method which can be employed to make the bulb shield shown in FIG. 9.

A method of making the bulb shield 20*a* shown in FIG. 9 will now be described with reference to FIG. 10 (FIG. 11). First, a plastic part is two-shot plastic injection mold. Specifically, preferably a relatively low melt plastic, such as polystyrene (230° Fahrenheit melt) is two shot molded with a relatively high melt plastic, such as PPS (510° Fahrenheit deflection temperature). Such a two shot molding process provides the two-material plastic piece 60 shown in FIG. 11, where the plastic piece 60 includes an upper portion 62 of the relatively low melt plastic, and a lower portion 64 of the relatively high melt plastic (layer 40*a*). Then, the layer 42*a* of metal material, such as copper at a thickness of 0.0100 to 0.0110 inches, is electro-formed onto the outside surface 38*a* of the cup portion 28*a,* onto the surface of the lower melt plastic 62. Then, a layer 44*a* of nickel is plated over the layer 42*a* of electro-formed copper at a thickness of 0.00015 to 0.0002 inches (thereby providing that which is shown in FIG. 11). Hence, the outside surface of the cup portion of the plastic part 60 functions as a mandrel for the electro-forming. Subsequently, the piece 60 is baked, such as at a temperature of 350° Fahrenheit, to melt away the lower melt plastic portion 62 of the cup portion 28*a.* Then, the inside surface 36*a* of the cup portion 28*a* is black finished, and the outside surface 38*a* of the cup portion 28*a* is decorative plated, such as with a layer 46*a* of chrome, for example at a thickness of 0.00035 to 0.0005 inches (thereby providing that which is shown in FIG. 9).

A bulb shield 20*b* which is in accordance with yet another embodiment of the present invention is shown in FIG. 12, and will now be described. Because the bulb shield 20*b* shown in FIG. 12 is very similar to the bulb shields 20 and 20*a* shown in FIGS. 2–7 and 9, respectively, similar reference numerals are used for corresponding parts, and the alphabetic suffix "b" is used.

The bulb section 20*b* includes a stem portion 30*b* made of metal, such as steel, and a cup portion 28*b* made of a plurality of metal layers 42*b,* 44*b,* 46*b,* such as copper, nickel and decorative chrome. Preferably, the cup portion 28*b* is heat staked to the stem portion 30*b,* and the copper layer 42*b* is electro-formed such that the electro-forming further secures the cup portion 28*b* to the stem portion 30*b.*

Figure 14:
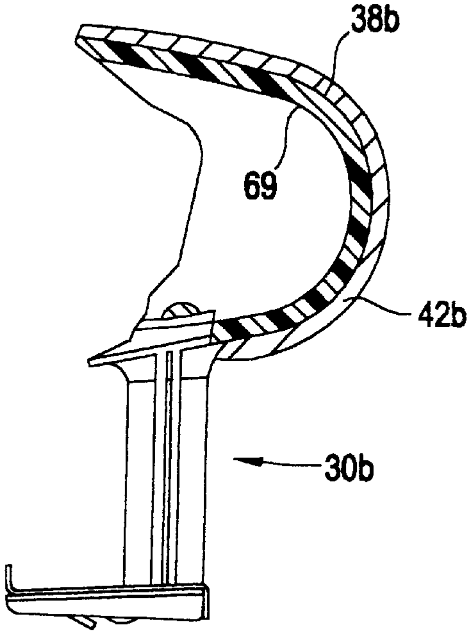
FIG. 14 is a view of the bulb shield shown in FIG. 12, but showing the plastic mandrel attached to the stem portion before the mandrel is melted away.
Figure 13:
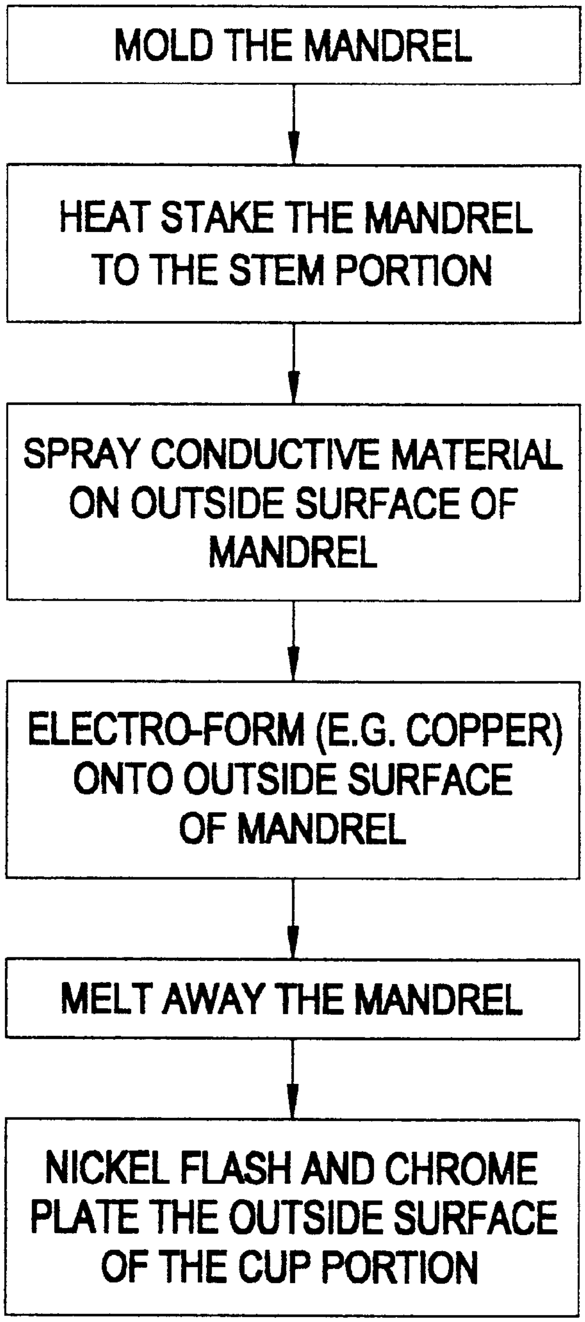
FIG. 13 is a block diagram of a method which can be employed to make the bulb shield shown in FIG. 12.

A method of making the bulb section 20*b* shown in FIG. 12 will now be described with reference to FIG. 13 (and FIG. 14). First a mandrel 69 is plastic injection molded, and then is heat staked to the stem portion 30*b,* which, as mentioned above, is preferably formed of steel (thereby providing that which is shown in FIG. 14). The mandrel 69 may include a receptacle slot and small studs to facilitate the heat staking. Then, a conductive material, such as silver nitrate, is sprayed or otherwise applied to the outside surface 38*b* of the mandrel 69. Subsequently, a metal layer 42*b,* such as copper at a thickness of 0.005–0.006, is electro-formed onto the conductive material, thereby providing that which is illustrated in FIG. 14. Preferably, the electro-forming further secures the stem portion 30*b* to the mandrel 69. Then, the overall assembly is baked to melt away the mandrel 69. Then, the assembly is nickel flashed (thereby providing layer 44*b*) and chrome plated (thereby providing layer 46*b*), thereby providing that which is illustrated in FIG. 12. To facilitate the plating bath, a thru slot may be provided in the cup portion 28*b* of the bulb shield 20*b.*

Each of the bulb shields 20, 20*a,* 20*b* described hereinabove is lightweight and relatively inexpensive to make. Additionally, the peripheral surface 48, 48*a,* 48*b* of the cup portion 28, 28*a,* 28*b* of each meets precision requirements. Also, each of the methods described hereinabove is simple and relatively inexpensive to perform.

While embodiments of the present invention are shown and described, it is envisioned that those skilled in the art may devise various modifications without departing from the spirit and scope of the foregoing description.

What is claimed is:

1. A bulb shield configured for use in an automotive headlamp assembly that includes a reflector and a headlamp bulb disposed in the reflector, said bulb shield comprising: a cup portion and a stem portion which extends from said cup portion and is configured for mounting relative to the headlamp bulb, wherein when said bulb shield is mounted, said cup portion is generally horizontally aligned with the headlamp bulb in the automotive headlamp assembly, at least a portion of said bulb shield being electro-formed, wherein said cup portion includes a plastic portion that has an inside surface and an outside surface, wherein when said bulb shield is mounted, said inside surface generally faces the headlamp bulb, said cup portion including at least one layer of metal material which is disposed on the outside surface of said plastic portion, said cup portion further comprising a layer of copper disposed on the plastic portion, a layer of nickel disposed on the layer of copper, and a layer of chrome disposed on the layer of nickel.

2. The bulb shield as recited in claim 1, wherein at least a portion of said cup portion is plastic.

3. The bulb shield as recited in claim 1, wherein at least a portion of said cup portion is metal.

4. The bulb shield as recited in claim 1, wherein at least a portion of said cup portion is plastic, and said cup portion includes metal which is disposed on the plastic.

5. The bulb shield as recited in claim 4, wherein said cup portion includes a plurality of layers of metal which are disposed on the plastic.

6. The bulb shield as recited in claim 1, wherein said cup portion has an inside surface and an outside surface, wherein when said bulb shield is mounted, said inside surface generally faces the headlamp bulb, wherein at least a portion of said inside surface is formed of plastic.

7. The bulb shield as recited in claim 1, wherein said cup portion has an inside surface and an outside surface, wherein when said bulb shield is mounted, said inside surface generally faces the headlamp bulb, wherein a portion of said insides surface is formed of plastic and a portion of said inside surface is formed of metal.

8. A method of making a bulb shield which is configured for use in an automotive headlamp assembly that includes a reflector and a headlamp bulb disposed in the reflector, said method comprising: providing a plastic part, said plastic part having a cup portion and a stem portion which extends from said cup portion and is configured for mounting relative to the headlamp bulb, wherein when said bulb shield is mounted, said cup portion is generally horizontally aligned with the headlamp bulb in the automotive headlamp assembly; and applying metal to said cup portion, further comprising applying heat to said bulb shield after applying the metal to said cup portion thereby melting away at least a portion of the cup portion of said plastic part.

9. The method as recited in claim 8, wherein the step of applying metal to said cup portion comprises electro-forming metal onto said cup portion.

10. The method as recited in claim 8, further comprising masking at least a portion of said cup portion and said stem portion before applying the metal to said cup portion.

11. A method of making a bulb shield which is configured for use in an automotive headlamp assembly that includes a reflector and a headlamp bulb disposed in the reflector, said method comprising: providing a plastic part, said plastic part having a cup portion and a stem portion which extends from said cup portion and is configured for mounting relative to the headlamp bulb, wherein when said bulb shield is mounted, said cup portion is generally horizontally aligned with the headlamp bulb in the automotive headlamp assembly; and applying metal to said cup portion, wherein the step of applying metal to said cup portion comprises applying a layer of copper to the cup portion, applying a layer of nickel on the layer of copper, and applying a layer of chrome on the layer of nickel.

12. The method as recited in claim 11, further comprising applying heat to said bulb shield after applying the metal to said cup portion thereby melting away at least a potion of the cup portion of said plastic part.

13. The method as recited in claim 12, wherein the step of applying metal to said cup portion comprises electro-forming metal onto said cup portion.

14. The method as recited in claim 12, further comprising masking at least a portion of said cup portion and said stem portion before applying the metal to said cup portion.

15. A method of making a bulb shield which is configured for use in an automotive headlamp assembly that includes a reflector and a headlamp bulb disposed in the reflector, said method comprising: providing a metal stem portion, providing a plastic cup portion; attaching said cup portion to said stem portion; and applying metal to said cup portion, said stem portion extending from said cup portion and configured for mounting relative to the headlamp bulb, wherein when said bulb shield is mounted, said cup portion is generally horizontally aligned with the headlamp bulb in the automotive headlamp assembly, further comprising applying heat to said cup portion after applying the metal to said cup portion thereby melting away at least a portion of the cup portion.

16. The method as recited in claim 15, wherein the step of applying metal to said plastic cup portion comprises electro-forming metal onto said cup portion.

17. The method as recited in claim 15, further comprising masking at least a portion of said cup portion before applying the metal to said cup portion.

* * * * *

UNITED STATES PATENT AND TRADEMARK OFFICE

CERTIFICATE OF CORRECTION

PATENT NO. : 6,375,341
DATED : April 23, 2002
INVENTOR(S) : Ronald S. Denley

It is certified that error appears in the above-identified patent and that said Letters Patent is hereby corrected as shown below:

<u>Column 5,</u>
Line 23, "becomes" should be -- because --
Line 57, "(FIG. 11)." should be -- (and FIG. 11). --
Line 38, "mold." should be -- molded. --

<u>Column 8,</u>
Line 20, "potion of the cup portion" should be -- portion of the cup portion --

Signed and Sealed this

Third day of September, 2002

*Attest:*

JAMES E. ROGAN

*Attesting Officer*

*Director of the United States Patent and Trademark Office*